United States Patent
Boos

(10) Patent No.: US 10,444,753 B2
(45) Date of Patent: Oct. 15, 2019

(54) METHOD FOR AT LEAST PARTIALLY AUTOMATED DRIVING IN A VEHICLE

(71) Applicant: Robert Bosch GmbH, Stuttgart (DE)

(72) Inventor: Ronald Boos, Waiblingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/559,515

(22) PCT Filed: Jan. 27, 2016

(86) PCT No.: PCT/EP2016/051664
§ 371 (c)(1),
(2) Date: Sep. 19, 2017

(87) PCT Pub. No.: WO2016/155905
PCT Pub. Date: Oct. 6, 2016

(65) Prior Publication Data
US 2018/0120838 A1 May 3, 2018

(30) Foreign Application Priority Data
Mar. 27, 2015 (DE) .......................... 10 2015 205 580

(51) Int. Cl.
*G05D 1/00* (2006.01)
*B60W 50/14* (2012.01)

(52) U.S. Cl.
CPC .......... *G05D 1/0061* (2013.01); *B60W 50/14* (2013.01); *B60W 2540/04* (2013.01); *G05D 2201/0213* (2013.01)

(58) Field of Classification Search
CPC .................................................. G05D 1/0061
See application file for complete search history.

(56) References Cited

U.S. PATENT DOCUMENTS

| | | | | |
|---|---|---|---|---|
| 6,226,570 B1 * | 5/2001 | Hahn | ................... | B60K 28/066 701/1 |
| 6,476,714 B2 * | 11/2002 | Mizuta | ................ | B60R 16/0232 340/461 |
| 9,235,211 B2 * | 1/2016 | Davidsson | ............ | B60W 50/14 |
| 2005/0030184 A1 * | 2/2005 | Victor | ................... | B60K 28/06 340/576 |
| 2014/0139341 A1 * | 5/2014 | Green | ................... | B60K 28/06 340/576 |

(Continued)

FOREIGN PATENT DOCUMENTS

| | | |
|---|---|---|
| CN | 104097642 A | 10/2014 |
| DE | 102008056343 A1 | 5/2010 |

(Continued)

OTHER PUBLICATIONS

International Search Report dated Apr. 6, 2016, of the corresponding International Application PCT/EP2016/051664 filed Jan. 27, 2016.

*Primary Examiner* — Alex C Dunn
(74) *Attorney, Agent, or Firm* — Norton Rose Fulbright US LLP; Gerard Messina

(57) ABSTRACT

In a method for at least partly automated driving in a vehicle, termination of the automated driving function and at least partial transfer of vehicle control to the driver is carried out only after expiration of a takeover time span that is ascertained from the actuation by the driver of a device communicating with the vehicle. The device can be a mobile device.

20 Claims, 1 Drawing Sheet

(56) References Cited

U.S. PATENT DOCUMENTS

| | | | |
|---|---|---|---|
| 2014/0244096 A1 | 8/2014 | An et al. | |
| 2015/0015386 A1* | 1/2015 | Langenhan | B60W 50/14 340/438 |
| 2015/0070160 A1* | 3/2015 | Davidsson | B60W 50/14 340/457 |
| 2016/0132705 A1* | 5/2016 | Kovarik | G06K 7/10376 340/10.3 |
| 2016/0347327 A1* | 12/2016 | Kondo | B60W 50/14 |

FOREIGN PATENT DOCUMENTS

| | | |
|---|---|---|
| DE | 102012201513 A1 | 8/2013 |
| DE | 102012112802 A1 | 6/2014 |
| EP | 913802 A2 | 5/1999 |
| EP | 2314489 A1 | 4/2011 |
| EP | 2848488 A1 | 3/2015 |
| JP | H09161196 A | 6/1997 |
| JP | H10309961 A | 11/1998 |
| JP | 2003127703 A | 5/2003 |
| JP | 3855730 B2 | 12/2006 |

* cited by examiner

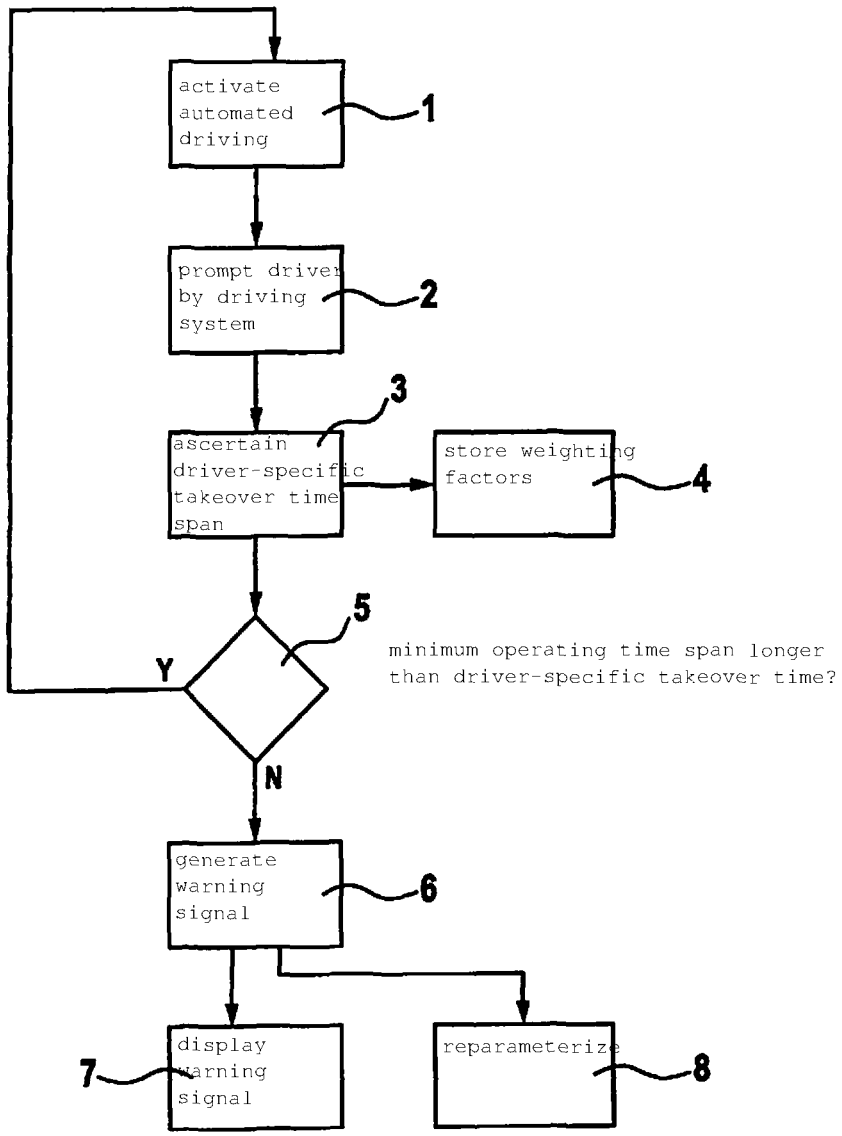

METHOD FOR AT LEAST PARTIALLY AUTOMATED DRIVING IN A VEHICLE

FIELD

The present invention relates to a method for at least partly automated driving in a vehicle.

BACKGROUND INFORMATION

Driver assistance systems that enhance driving safety by way of an automatic intervention regarding vehicle parameters, for example automatically regulated braking interventions in the context of an antilock system or an electronic stability program, are known. Also known are driver assistance systems that assist with a driving task or in fact carry it out in partly automated fashion in that an intervention regarding transverse and/or longitudinal guidance is carried out, for example in the context of a lane-keeping assistant (staying within a lane) or parking assistant (automatic steering into parking spaces).

U.S. Pat. App. Pub. No. 2014/0244096 A1 describes a system for autonomous driving in a vehicle, in which the current driver state is determined on the basis of driver activities, and a driver risk index is ascertained therefrom and is utilized in a driving control unit to apply control to various driving states. In the driving control unit, the vehicle can be guided partly autonomously or entirely autonomously depending on the driver risk index. For example, in order to return from a fully autonomous driving state to a partly autonomous driving state, the driver is prompted by the system, via a signal, to take over control of the vehicle.

SUMMARY

An object of the present invention includes ensuring, with simple measures, a safe transition from at least partly automated driving to manual driving or to driving with a low degree of automation, in a vehicle.

Refinements of the present invention are described herein.

An example method according to the present invention relates to a vehicle, in particular a motor vehicle, that is equipped with a driving system that enables at least partly automated, if applicable highly automated or fully automated, driving of the vehicle. In partly automated driving only a partial function is taken over by the driving system, for example longitudinal dynamics with automatic braking and acceleration interventions, while conversely the remaining driving functions are taken over by the driver, for example transverse dynamics via manual interventions regarding the steering system. In fully automated driving, conversely, all interventions regarding the longitudinal and transverse dynamics of the vehicle are carried out automatically at the driving system, and no manual interventions by the driver are necessary. In highly automated driving, which presents a lesser degree of automation than fully automated driving, transverse and/or longitudinal guidance is carried out automatically for a specific time period and in specific situations.

The example method relates both to a transition from fully automated driving to highly or partly automated, assisted, or manual driving, and to a transition from partly automated driving to partly automated driving with a lesser degree of automation or to entirely manual driving, in which the vehicle is guided without activation of the driving system and solely by the driver. In each case, after completion of the transition the driver must implement a higher degree of driver activity in order to guide the vehicle than before the transition.

With the example method according to the present invention, a takeover time span elapses between the termination of autonomous driving functioning and the transfer of vehicle control from the driving system to the driver. It is only after expiration of the takeover time span (starting at a prompt on the part of the driving system to the driver to take over manual guidance of the vehicle) that the corresponding function is transferred from the driving system to the driver. The takeover time span is driver-specific, and is ascertained from the actuation of a device communicating with the vehicle.

An advantage of this embodiment is that the takeover time span can be determined as an individual time variable based on current driver activity in the vehicle. It is possible, for example, to proceed from a standard value of the takeover time span which is individually adapted, based on driver activity, during automated driving. The "driver activity" refers here to the actuation by the driver of the device communicating with the vehicle. The driver is more or less distracted depending on the nature and extent of the actuation of the device; this is expressed as a correspondingly longer or shortened takeover time span. Both the extent of the actuation and the nature of the actuation can be taken into account in order to define the takeover time span. Both the nature of the device communicating with the vehicle, and the nature of the utilization of the device, can be taken into consideration.

The device is preferably a mobile device that optionally can be connected to the vehicle in order to create a communication between the device and the vehicle or a closed- or open-loop control device in the vehicle. The connection can be accomplished via a cable or wirelessly, for example via Bluetooth. Alternatively to a mobile device, said device is fixedly integrated into the vehicle, for example in the form of a navigation system that is operated by the driver.

The mobile device is, for example, a smartphone, a tablet, a mobile telephone, a notebook, a smartwatch, or other "wearable devices" such as data glasses. At least one data transfer from the mobile device to the vehicle should be possible so that the driver activity on the device can be conveyed to the vehicle. According to an advantageous embodiment, a communication connection from the vehicle to the device also exists, so that data can also be transferred from the vehicle to the device.

It is possible to transfer only sensor data, for example a key actuation on the device, from the device to the vehicle, and to handle evaluation of the sensor data in the vehicle or in a closed- or open-loop control device installed therein. In an alternative embodiment, on the other hand, evaluation of the sensor data already occurs in the device, only the evaluated information being transferred from the device to the vehicle or to the closed- or open-loop control device. The takeover time span results from the evaluated sensor data.

According to an advantageous embodiment, the driver-specific takeover time span is compared with a minimum operating time span that is continuously ascertained in the driving system. The minimum operating time span represents the time span, starting at the current point in time, during which the vehicle can still drive automatically under the control of the driving system. The minimum operating time span is continuously updated, can continuously change, and can assume values between 0 and ∞. For example, under constant environmental conditions, e.g., while driving on an expressway, the minimum operating time span can assume the value ∞ provided an unforeseen event does not occur. If an event modifying the driving situation does occur, however, for example a third-party vehicle suddenly cutting in directly in front of the vehicle driving in automated or partly automated fashion, the minimum operating time span can then be set to a lower value, if applicable to 0; and similarly in emergency situations such as an accident.

In a control situation, the minimum operating time span should be longer than the driver-specific takeover time span in order to give the driver sufficient time to take over the driving function. If this is not possible, however, for example when an unforeseen event occurs so that the minimum operating time span is shorter than the current driver-specific takeover time span, then advantageously a warning signal is generated. According to a preferred embodiment said signal is displayed to the driver, for example, in an optical, acoustic, and/or haptic manner. A prompt for immediate takeover of the driving function by the driver can be associated with the warning signal.

According to a further useful embodiment, the warning signal serves to automatically influence a system or assembly in the vehicle, which can also, if applicable, be the device that is or can be actuated by the driver. For example, it can be useful to limit the scope of permissible actuation of the device, for example to less concentration-intensive activities, in order to distract the driver less from driving events. Additionally or alternatively, an intervention regarding the driving system for automated driving or regarding another system or assembly in the vehicle is also possible so as to modify parameters, for example in order to carry out a pre-filling with hydraulic brake fluid in the braking system.

According to a further useful embodiment, the minimum operating time span is calculated on the basis of sensorially ascertained vehicle state variables and/or environmental information items. The vehicle has a sensor suite with which the corresponding variables or information items can be detected or from which the variables or information items can be calculated.

It can furthermore be useful, for ascertaining the driver-specific takeover time span, to assign different actuation weighting factors to different actuations of the device by the driver. It is thereby possible, for example, to distinguish between concentration-intensive and less concentration-intensive actuations, such that an actuation that requires greater concentration also results in a lengthening of the takeover time span.

Further actuations by the driver, and behaviors, can also be incorporated into the ascertaining of the takeover time span. For example, it is possible to use information from an interior camera that is monitoring the driver, or to utilize sensor information from which the current state of the driver can be inferred, for example the actuation of control elements such as driving pedals.

According to a further useful embodiment at least one driving weighting factor, with which the driver type is characterized, is ascertained from the actuations of the device which are the basis for ascertaining the takeover time span. The driving weighting factor makes it possible, for example, to distinguish different driver types, for example sporty drivers and safety-oriented drivers. The driving weighting factor is ascertained in particular over a longer time period and thus represents an average which nevertheless can also, if applicable, change during a journey, for example if the driver's attentiveness decreases.

According to a further useful embodiment one or more actuation weighting factors and/or driving weighting factors are stored on the device and can be reused as applicable in the context of a future automated journey. The weighting factors thereby improve the initial value for the future automated journey, so that an improved driver-specific takeover time span is already available at the beginning of the future automated journey.

In addition or alternatively to the weighting factor, it can also be useful to store another driver-specific characteristic value on the device, for example the most recent value of the takeover time span, and reuse it in the context of a future automated journey.

The method according to the present invention executes in a closed- or open-loop control device that is integrated into the vehicle and, in particular, is a constituent of the driving system with which autonomous driving is controlled in the vehicle. It can be useful, however, as described above, to carry out some of the evaluation on the device, in particular the mobile device, and to transfer the evaluated information via the communication interface to the closed- or open-loop control device.

The driving system of which the closed- or open-loop control device is a part is a system for influencing the longitudinal and/or transverse dynamics in the vehicle, for example a braking system, in particular having a integrated antilock system function and/or an electronic stability program, a drive slip control system, a steering system having an electric servomotor, or the like.

Both the device, in particular the mobile device, and the vehicle are respectively equipped with a communication unit by way of which a data transfer at least from the device to the vehicle, preferably also in the opposite direction, is possible. The communication units represent a communication interface for data exchange. In the case of a mobile device the communication can occur wirelessly, for example via Bluetooth, or via cable.

Further advantages and useful embodiments are to be gathered from the description herein and the FIGURE.

BRIEF DESCRIPTION OF THE DRAWING

The FIGURE shows a flow chart for carrying out an example embodiment of the present invention.

DETAILED DESCRIPTION OF EXAMPLE EMBODIMENTS

A prerequisite for carrying out the example method is a vehicle having a driving system with which the vehicle can be controlled in at least partly, if applicable entirely, automated fashion. The driving system encompasses a closed- or open-loop control device in which positioning signals are generated on the basis of received sensor information in order to apply control to assemblies in the vehicle which influence the longitudinal and/or transverse dynamics, for example the braking system, the drive motor, and/or the steering system. Installed in the vehicle is a sensor suite with which it is possible to ascertain current vehicle state variables, for example wheel rotation speed sensors or acceleration sensors, and environmental information, for example radar devices or cameras.

The method described in the flow chart proceeds, in step 1, from an activation of the driving system for automated driving in a vehicle. Activation is accomplished in particular by manually switching on by the driver, and relates to partly or entirely automated driving by the fact that the driving system correspondingly takes over control of the vehicle for automatic adjustment of longitudinal and/or transverse dynamics.

In the next method step 2, during automated driving a minimum operating time span $t_v$ during which, starting from the present point in time, the vehicle is at least still capable of driving in automated fashion is ascertained. The minimum operating time span $t_v$ depends principally on environmental conditions, for example on third-party vehicles in the vicinity of the vehicle driving in automated fashion, or on weather conditions. For example, in steady-state expressway driving with no passing maneuvers, the minimum operating time span $t_v$ during which automated driving is at least still possible approaches ∞, while conversely in emergency situations, for example when an accident has been detected, the minimum operating time span $t_v$ approaches 0 or can assume the value 0; in the latter case an immediate transfer of the driving function from the automated driving system to the driver can be necessary. The transition can occur gradually so that, for example in the case of fully automated driving, a reduction to partly automated driving is carried out by the fact that, for example, the steering function transitions from the automated driving system to the driver but the braking and acceleration functions continue to be handled by the automated driving system. It is also possible to transition directly from the fully automated driving state entirely to manual driving, or from a highly or partly automated driving state to manual driving.

The transfer from automated driving to manual driving is accomplished after a prompt by the driving system. In a control situation, the transition takes place after expiration of a driver-specific takeover time span $t_D$ during which the vehicle is still guided in automated fashion, and which makes it possible for the driver to direct his or her attention toward manual guidance of the vehicle.

In the next method step 3 the driver-specific takeover time span $t_D$, characterizing the time period needed by the driver to take over control function in the vehicle, is ascertained. The takeover time span $t_D$ is a driver-specific and situation-dependent variable that depends on the driver type but also on the current condition and current activity of the driver during automated driving. The actuation by the driver of a device communicating with the vehicle is utilized in order to ascertain the takeover time span $t_D$. That device is preferably a mobile device, for example a smartphone, a tablet, a notebook, or a so-called "wearable device" such as a smartwatch. The mobile device is connected to the vehicle and communicates with it, for example, wirelessly via Bluetooth or via a connecting cable. From the actuation of the device by the driver, a conclusion can be drawn as to the current attentiveness state of the driver, that being utilized to ascertain the takeover time span $t_D$.

Alternatively to a mobile device, the actuation of a device fixedly installed in the vehicle can also be utilized for ascertaining the driver-specific takeover time span $t_D$, for example a navigation system integrated into the vehicle.

The device communicates with the vehicle, at least a data transfer from the device to the vehicle being possible, but preferably also a data transfer in the opposite direction.

The various actuations of the device by the driver can be assigned different actuation weighting factors. What is taken into account here is the fact that different kinds of use are associated with different levels of concentration. For example, reading messages is associated with a lower attentiveness state than inputting a message or absorbing confidential information such as bank account excerpts. Actuation weighting factors of different magnitudes can accordingly be assigned to such activities, an activity that requires a higher attentiveness state being multiplied by a larger actuation weighting factor than an activity having a lower attentiveness state. In addition to the attentiveness state, already recited above, that is necessary for a specific activity, the actuation weighting factors can also relate to a motor requirement, for example because typing a message represents a more complex motor activity than setting the mobile device aside.

The various activities can furthermore have individual time estimates associated with them, which are added up to yield a total time that in turn is multiplied by the various actuation weighting factors. The individual time estimates encompass, for example, reading internet messages, reading emails, motor activities such as setting the mobile device aside, telephoning, etc.

The takeover time span $t_D$ is ascertained from the information recited above. In step 4 the actuation weighting factors can be stored on the device and used as initial values for the next automated journey, thus resulting in improved initial conditions for ascertaining the takeover time span. The takeover time span that exists at the time of the transition from automated to driver-specific driving can also, if applicable, be stored on the device.

In the next method step 5 a query is made as to whether the minimum operating time span $t_v$ of the automated driving system is longer than the driver-specific takeover time span $t_D$. If so, it is possible to transition safely at any time from the automated driving state to manual driving. It is thus also possible to continue automated driving with the aid of the driving system. In this case execution branches via the Yes branch ("Y") back to the first method step 1, and the entire method is executed again at cyclic intervals.

If the result of the query in step 5 is that the minimum operating time span $t_v$ of the automated driving system is not longer than the driver-specific takeover time span $t_D$, however, a sufficient time reserve then does not exist for an ordinary transition, with sufficient driving safety, from the automated system to individual driving. In this case execution continues along the No branch ("N") to the next method step 6, in which a warning signal is generated. The warning signal on the one hand can be displayed, according to step 7, to the driver in an acoustic, optical, and/or haptic manner; on the other hand, in method step 8 the warning signal can also result in a change in the state of a system in the vehicle. In this context, for example, the permissible range of functionality of the device that is being actuated by the driver is limited, in particular to less distracting and less concentration-intensive activities. For example, the entry of data can be blocked but reading of information can still be permitted.

In addition, however, according to step 8 it is also possible for the warning signal to lead to a reparameterization in a vehicle system, for example in the braking system, for example such that a pre-filling with hydraulic brake fluid is carried out.

What is claimed is:

1. A method for automated driving in a vehicle, in which a driving system carries out one or more driving functions in automated fashion, the method comprising:
    operating the vehicle in an automated fashion using an automated driving function;
    while the vehicle operates using the automated driving function, prompting a driver by the driving system;
    after the prompting, ascertaining, by the driving system, a takeover time span based on an actuation of a device communicating with the vehicle by the driver, wherein the device is a mobile device that communicates with the vehicle wirelessly or via a connecting cable; and
    only after expiration of the takeover time, terminating, by the driving system, the automated driving function;

wherein for ascertaining the takeover time span, different actuations of the device by the driver are assigned different actuation weighting factors, the actuation weighting factor assigned to the actuation of the device being taken into account in ascertaining the takeover time span.

2. The method as recited in claim 1, wherein for the case in which a minimum operating time span, during which the vehicle is still driving in the automated fashion using the automated driving function, is shorter than the takeover time span, a warning signal is generated.

3. The method as recited in claim 2, wherein: (i) the warning signal is displayed to the driver, and/or (ii) the warning signal results in a limitation of a permissible actuation of the device.

4. The method as recited in claim 2, wherein the minimum operating time span is calculated on the basis of at least one of (i) sensorially ascertained vehicle state variables, and (ii) environmental information.

5. The method as recited in claim 1, wherein the actuation weighting factors are stored on the device and are reused in the context of a future partly, highly, or fully automated journey.

6. A closed- or open-loop control device for at least partly automated driving in a vehicle, in which a driving system carries out one or more driving functions in automated fashion, the control device designed to:
   operate the vehicle in an automated fashion using an automated driving function;
   while the vehicle operates using the automated driving function, prompt a driver by the driving system;
   after the prompt, ascertain, by the driving system, a takeover time span based on an actuation of a device communicating with the vehicle by the driver, wherein the device is a mobile device that communicates with the vehicle wirelessly or via a connecting cable; and
   only after expiration of the takeover time, terminate, by the driving system, the automated driving function;
   wherein for ascertaining the takeover time span, different actuations of the device by the driver are assigned different actuation weighting factors, the actuation weighting factor assigned to the actuation of the device being taken into account in ascertaining the takeover time span.

7. A driving system in a vehicle for partly, highly, or fully automated driving, in which a driving system carries out one or more driving functions in automated fashion, the driving system having a closed- or open-loop control device, the control device designed to:
   operate the vehicle in an automated fashion using an automated driving function;
   while the vehicle operates using the automated driving function, prompt a driver by the driving system;
   after the prompt, ascertain, by the driving system, a takeover time span based on an actuation of a device communicating with the vehicle by the driver, wherein the device is a mobile device that communicates with the vehicle wirelessly or via a connecting cable; and
   only after expiration of the takeover time, terminate, by the driving system, the automated driving function;
   wherein for ascertaining the takeover time span, different actuations of the device by the driver are assigned different actuation weighting factors, the actuation weighting factor assigned to the actuation of the device being taken into account in ascertaining the takeover time span.

8. A vehicle for partly, highly, or fully automated driving, in which a driving system carries out one or more driving functions in automated fashion, having a driving system with a closed- or open-loop control device, the control device designed to:
   operate the vehicle in an automated fashion using an automated driving function;
   while the vehicle operates using the automated driving function, prompt a driver by the driving system;
   after the prompt, ascertain, by the driving system, a takeover time span based on an actuation of a device communicating with the vehicle by the driver, wherein the device is a mobile device that communicates with the vehicle wirelessly or via a connecting cable; and
   only after expiration of the takeover time, terminate, by the driving system, the automated driving function;
   wherein for ascertaining the takeover time span, different actuations of the device by the driver are assigned different actuation weighting factors, and wherein the actuation weighting factors are stored, the actuation weighting factor assigned to the actuation of the device being taken into account in ascertaining the takeover time span.

9. The vehicle as recited in claim 8, further comprising:
   a communication interface for connecting the mobile device.

10. The vehicle as recited in claim 9, wherein the mobile device is a smartphone, or a mobile telephone, or a tablet, or a smartwatch.

11. The method as recited in claim 1, wherein the mobile device is a smartphones, or a mobile telephone, or a tablet, or a smartwatch.

12. The method as recited in claim 1, wherein the mobile device communicates with the vehicle wirelessly via Bluetooth.

13. The method as recited in claim 2, wherein based on the warning signal, a range of functionality of the device is limited.

14. The method as recited in claim 2, wherein based on the warning signal, data entry on the device is blocked.

15. The method as recited in claim 2, wherein based on the warning signal, a braking system of the vehicle is pre-filled with hydraulic brake fluid.

16. The control device as recited in claim 6, wherein the mobile device is a smartphones, or a mobile telephone, or a tablet, or a smartwatch.

17. The control device as recited in claim 6, wherein for the case in which a minimum operating time span, during which the vehicle is still driving in the automated fashion using the automated driving function, is shorter than the takeover time span, a warning signal is generated, and wherein based on the warning signal, a range of functionality of the device is limited.

18. The control device as recited in claim 17, wherein based on the warning signal, data entry on the device is blocked.

19. The control device as recited in claim 6, wherein the actuation weighting factors are stored on the device and are reused in the context of a future partly, highly, or fully automated journey.

20. The control device as recited in claim 6, wherein based on the warning signal, a braking system of the vehicle is pre-filled with hydraulic brake fluid.

* * * * *